US012583475B1

(12) United States Patent
Almeida et al.

(10) Patent No.: US 12,583,475 B1
(45) Date of Patent: Mar. 24, 2026

(54) SENSOR PLATFORM

(71) Applicant: Zoox, Inc., Foster City, CA (US)

(72) Inventors: Reginaldo Alves de Almeida, Foster City, CA (US); Anthony Earl, Witney (GB); Carter William Mceathron, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 157 days.

(21) Appl. No.: 17/833,505

(22) Filed: Jun. 6, 2022

(51) Int. Cl.
*B60W 60/00* (2020.01)
*G06V 20/58* (2022.01)

(52) U.S. Cl.
CPC .......... *B60W 60/001* (2020.02); *G06V 20/58* (2022.01); *B60W 2420/403* (2013.01); *B60W 2420/408* (2024.01); *B60W 2420/54* (2013.01); *B60W 2555/20* (2020.02)

(58) Field of Classification Search
CPC ......... B60W 60/001; B60W 2420/403; B60W 2420/408; B60W 2420/54; B60W 2555/20; G06V 20/58
USPC .......................................................... 701/23
See application file for complete search history.

(56) References Cited

U.S. PATENT DOCUMENTS

| | | | | |
|---|---|---|---|---|
| 9,630,619 | B1 | 4/2017 | Kentley et al. | |
| 10,543,838 | B2 * | 1/2020 | Kentley-Klay | G06F 3/04842 |
| 10,558,224 | B1 * | 2/2020 | Lin | G05D 1/0285 |
| 11,352,769 | B1 * | 6/2022 | Kikani | E02F 9/264 |
| 2007/0005202 | A1 * | 1/2007 | Breed | G07C 5/008 |
| | | | | 714/25 |

| | | | | |
|---|---|---|---|---|
| 2017/0106794 | A1 * | 4/2017 | Constantine | G08G 1/165 |
| 2019/0004530 | A1 * | 1/2019 | Tascione | G05D 1/0231 |
| 2019/0147331 | A1 * | 5/2019 | Arditi | G06N 3/045 |
| | | | | 706/20 |
| 2019/0310651 | A1 * | 10/2019 | Vallespi-Gonzalez | |
| | | | | G01S 17/58 |
| 2020/0084920 | A1 * | 3/2020 | Frederick | G05D 1/0088 |
| 2021/0108926 | A1 * | 4/2021 | Tran | G06T 17/05 |
| 2021/0138647 | A1 * | 5/2021 | Kim | G05D 1/0289 |
| 2021/0339685 | A1 | 11/2021 | Adams et al. | |
| 2021/0406618 | A1 * | 12/2021 | Park | G06T 7/70 |
| 2022/0058894 | A1 * | 2/2022 | Salles | B60W 50/14 |
| 2022/0097625 | A1 * | 3/2022 | Russell | B60R 1/12 |
| 2022/0144185 | A1 * | 5/2022 | Burnette | H04N 23/90 |
| 2022/0204017 | A1 * | 6/2022 | Barton-Sweeney | |
| | | | | B60W 40/068 |

(Continued)

FOREIGN PATENT DOCUMENTS

WO      WO-2022087379 A1 *   4/2022   ............. B60R 11/04

OTHER PUBLICATIONS

"Multiplexing;" Microsoft Computer Dictionary; May 1, 2002; Microsoft Press; Fifth Edition; p. 352. (Year: 2002).*

(Continued)

*Primary Examiner* — Andrew R Dyer
(74) *Attorney, Agent, or Firm* — EIP US LLP

(57)                 ABSTRACT

Techniques for collecting sensor data from an environment in which a vehicle operates are discussed herein. The sensor data may be collected from sensors mounted on a sensor platform which is mounted to the vehicle. The vehicle may be operated in a non-autonomous mode. The sensor data may be used to train a machine learned model for use by a purpose-built autonomous vehicle operating in the environment. Sensors mounted on the sensor platform may correspond to sensors which are built into the purpose-built autonomous vehicle.

20 Claims, 6 Drawing Sheets

(56) References Cited

U.S. PATENT DOCUMENTS

| 2023/0100827 A1* | 3/2023 | Zhou | G06N 3/08 |
| | | | 701/26 |
| 2023/0127799 A1* | 4/2023 | Ashby | H04W 4/38 |
| | | | 701/1 |
| 2023/0182766 A1* | 6/2023 | Chou | G01S 7/40 |
| | | | 701/23 |

OTHER PUBLICATIONS

Definition of multiplexing (Year: 2002).*
Wang et al., "Imitation learning based decision-making for autonomous vehicle control at traffic roundabouts," May 4, 2022, Multimedia Tools and Applications, 81, pp. 39873-39889.*
Jim Martin, Nextbase 312GW review, Nov. 21, 2016, Tech Advisor, pp. 1-11.*

* cited by examiner

SENSOR PLATFORM

BACKGROUND

An autonomous, or driverless, vehicle operates using a control system which uses sensor data acquired from sensors as inputs, to determine whether objects are present in the vehicle's surroundings and accordingly to control the movement of the vehicle. In the case of a vehicle model designed for driverless operation, referred to herein as an autonomous vehicle model, the sensors may be integral to the basic vehicle design. In an autonomous vehicle model, manual vehicle controls which allow control of the vehicle's speed and direction by an occupant of the vehicle, may be limited or not present. An autonomous vehicle model may be suitable for a providing a taxi service, without requiring a human driver.

Aspects of a control system for an autonomous vehicle model may be developed or improved using machine learning techniques, using sensor data acquired previously as training data. The development of the control system for an autonomous vehicle operating in a specific location, such as a city, may comprise obtaining sensor data from a vehicle operating in that location.

The use of a type of vehicle, which is different to an autonomous vehicle model, and which may be a non-autonomous vehicle model or semi-autonomous vehicle model, may allow the acquisition of suitable sensor data in circumstances where the use of the driverless vehicle model is not possible, for example due to regulatory constraints. The use of a different type of vehicle to acquire the sensor data may be generally preferable for other reasons, which may relate to cost of operation, the availability of driverless vehicles, the ability for full control of a vehicle by a human driver, and/or the level of development of the control system in respect of a particular location.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
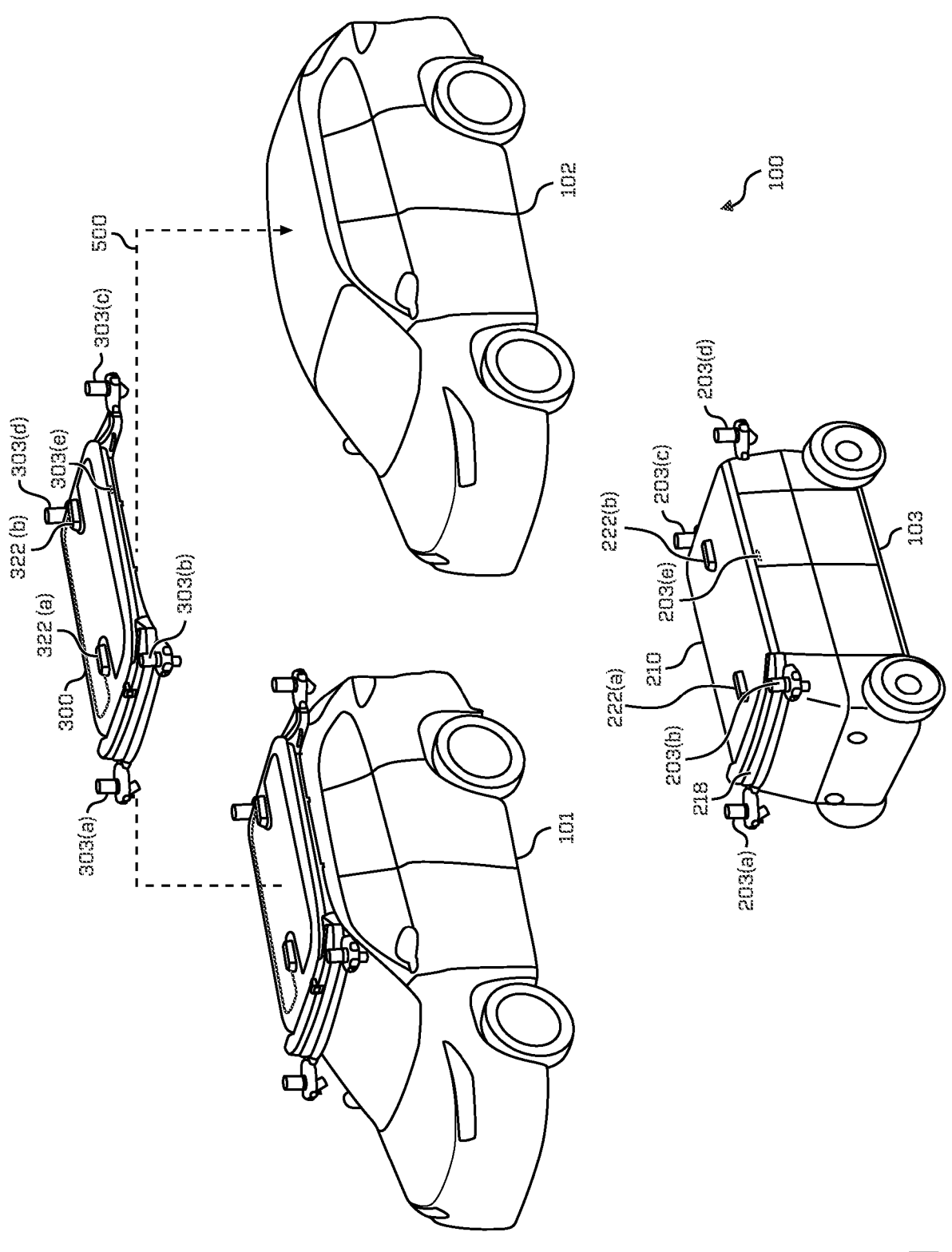
FIG. 1 illustrates an example system and process in accordance with the present disclosure.

An autonomous vehicle model may comprise sensors which are built-in and form an integral part of the design of the vehicle, and which are used to generate sensor data as inputs to a control system. The control system may use the sensor data to identify a location of the driverless vehicle, and/or to detect other objects in the vicinity of the driverless vehicle. The control system may further determine a desired destination of the driverless vehicle. Based on the desired destination and the identified objects and location, the control system may generate signals to control aspects of the driverless vehicle's behavior. For example, the control system may generate control signals to control motors or brakes, steering or to generate audio or light signals which can provide an indication to nearby road users or pedestrians that, for example, the driverless vehicle is about to make a turn.

The control system may be configured based on previously-acquired sensor data. For example, using machine learning techniques, the control system can be configured to generate more accurate determinations as to the location and nature of an object which is in the vicinity of the driverless vehicle. Accordingly, the control system can be updated to generate improved control outputs in a given scenario.

This disclosure is generally directed to a sensor platform comprising sensors configured to generate sensor data, which is mountable to, and removable from, a 'host vehicle' other than an autonomous vehicle model. The host vehicle may be a non-autonomous or a partially autonomous vehicle model, having a lessor capability for performing safety-critical functions for a trip than the autonomous vehicle model, and/or may require occupants to control the host vehicle for at least some of the time. The present application also relates to systems and techniques for sensor data acquisition which is suitable for developing or improving a control system for an autonomous vehicle, using sensors mounted to a vehicle model other than the autonomous vehicle model. Moreover, the systems and techniques discussed herein may permit the efficient use of sensor equipment with multiple host vehicles. In particular, sensor equipment initially mounted on a first host vehicle may be more easily re-used with a second host vehicle, should the first host vehicle develop a fault, be damaged, or otherwise be unavailable or unsuitable for use in a particular situation.

The sensor platform comprises two or more sensors mounted on a sensor platform body. The host vehicle, with the sensor platform mounted, may be driven in a particular environment or design domain. A design domain may be characterized by one or more of a location or region (e.g. city), a time of day (e.g. during daylight hours), a weather situation (e.g. during freezing precipitation, during rain or fog, or in a particular air temperature range). While the host vehicle is driven within this design domain, sensor data may be acquired from the sensors on the sensor platform. This sensor data may be used for the development of a control system for the autonomous vehicle model. In order to ensure that the sensor data thus acquired is suitable for the development of the control system for the autonomous vehicle model, performance characteristics of the sensors, when mounted on the host vehicle are the same as (or within a predetermined tolerance of) that of corresponding sensors of the autonomous vehicle model. For example, the locations of one or more sensors of the sensor platform, when mounted on the host vehicle, may correspond to the locations of corresponding sensors of the autonomous vehicle model, such that detection regions of the sensors, with respect to the sensors mounted on the host vehicle and those built-in to the autonomous vehicle model are the same.

The sensors being mounted in corresponding positions/orientations on the sensor platform and purpose-built autonomous vehicle (or otherwise having substantially the same performance characteristics) can simplify and/or improve the training of machine learning models for use in the autonomous vehicle. For example, the ability to detect external objects by machine learned model(s) can be based on sensor input from different modalities of sensors as described in U.S. patent application Ser. No. 16/779,576, titled "OBJECT DETECTION AND TRACKING," filed on Jan. 31, 2020 which is hereby incorporated by reference in its entirety and for all purposes. As disclosed herein, different machine learning models may be trained for different locations (e.g., different design domains). When expanding the use of purpose-built autonomous vehicles into new design domains, the use of the disclosed sensor platform can expedite and/or reduce operational costs in mapping and/or obtaining sufficient sensor data for the new design domain to support training machine-learned models.

The sensor platform may be removed from one host vehicle, and subsequently mounted on a different host vehicle. Accordingly, in the event of a fault or removal from service of a host vehicle, the sensor platform (including the sensors) can be re-used on a different host vehicle. Because the sensor platform includes multiple sensors, a single mounting or removal operation is effective to attach or remove the multiple sensors to or from the host vehicle.

In some examples of the present disclosure, the sensors on the sensor platform are mounted on the platform body so that when the sensor platform including the sensors is mounted on a host vehicle, a calibration procedure is either simplified or not required. For example, after mounting the sensor platform on a host vehicle, a single calibration procedure may be carried out on the sensor platform. The calibration procedure may determine an alignment of the sensors with respect to the vehicle, one or more fiducials, or with the ground, in accordance with the calibration of respective sensors on the autonomous vehicle. The determined alignment may be used to determine suitable pre-processing required for sensor data acquired from the sensor platform. In some examples, sensors may be mounted rigidly on the platform body.

The sensor platform may include a communications interface for transmitting sensor data to a control system which may be comprised within the host vehicle.

FIG. 1 illustrates an example system 100 in accordance with the present disclosure. FIG. 1 shows an autonomous vehicle model 103, which comprises built-in sensors 203. The built-in sensors 203 may comprise sensors of different modalities. For example, one or more of the sensors 203 may be a depth sensor, and one or more may be a microphone. The built-in sensors 203 may comprise a group of individual sensors of a common modality (e.g. light detection and ranging (LIDAR), RADAR, vision, infrared, microphone).

In the example of FIG. 1, the autonomous vehicle model 103 has four wheels located at the four corners of the vehicle and four built-in sensors located at the four corners of the vehicle, to provide suitable operative sensing coverage. Each of the four sensors 203 (a)-(d) is located within a respective sensor pod, as disclosed in the in U.S. patent application Ser. No. 16/864,109 filed on Apr. 30, 2020 and published as US 2021/0339685 A1, titled "SENSOR POD COVERAGE AND PLACEMENT ON VEHICLE," which is hereby incorporated by reference in its entirety and for all purposes. In the example of FIG. 1, each sensor pod includes a single sensor. However, in other examples, a sensor pod may comprise one or more further sensors (not shown in FIG. 1). Each sensor pod may be removably coupled to the autonomous vehicle by means of a respective mounting interface.

In examples, the sensors 203 (a)-(d) may comprise a set of depth sensors (such as LIDAR sensors) located within sensor pods which are approximately at roof level at the four corners of the autonomous vehicle model 103, and arranged so that, collectively, a detection region of the set of depth sensors 203 (a)-(d) extends in all directions in a horizontal plane around the autonomous vehicle model 103.

In some examples, one or more of the sensors 203 are built-in to the autonomous vehicle model 103 in an integral manner such that removal of the sensors is not possible without, for example, damaging either the sensor and/or damaging or dismantling some part or all of the rest of the autonomous vehicle.

Data generated by the built-in sensors 203 may be used to autonomously control an instance of the autonomous vehicle model 103. The autonomous vehicle model 103 may be an autonomous vehicle model configured to operate according to a Level 5 classification defined by the U.S. National Highway Traffic Safety Administration. This classification describes a vehicle capable of performing all safety-critical functions for an entire trip, without occupants of the vehicle being required to control the vehicle at any time. In other examples, the autonomous vehicle model 103 may be a partially autonomous vehicle model having a different level of classification, and the data captured by the sensors 203 may be used to assist, cither passively or actively, a driver of the autonomous vehicle model 103. Also, while examples are given in which the vehicle is a land vehicle, the techniques described herein are also applicable to aerial, marine, and other vehicles.

In the illustrated example, the autonomous vehicle model 103 is of a bidirectional design, having interchangeable directions of travel, and comprises a first group of built-in sensors, e.g. four built-in depth sensors 203 (a)-(d) located at various positions around the autonomous vehicle model 103. In other examples, the autonomous vehicle model 103 may comprise an alternative number of sensors. In the illustrated example, the depth sensors 203 (a)-(d) are arranged symmetrically about the vehicle. A first pair of sensors 203 (a), 203 (b) are located at a first end of the autonomous vehicle model 103 and face in a first direction of travel, one on each side of the vehicle. A second pair of sensors 203 (c), 203 (d) are located at a second end of the autonomous vehicle model 103 and face in a second direction of travel, one on each side of the vehicle. In other examples, the arrangement of the depth sensors may be asymmetric, and/or a different number of depth sensors may be used, particularly but not exclusively if the autonomous vehicle model 103 is unidirectional in design.

In some examples, the autonomous vehicle model 103 may comprise a microphone sensor 203 (c), such as a microphone array. The microphone sensor 203 (c) may be used to detect audio generated externally to the autonomous vehicle model 103. For example, the microphone sensor 203 (c) may be configured to detect sirens of emergency vehicles. To avoid wind noise being detected by the microphone and degrading the ability of the autonomous vehicle to detect desired audio signals (e.g. sirens), the microphone sensor 203 (c) may be located in a particular location, such as within a cavity, or at a position where airflow turbulence is low. Accordingly, a performance characteristic of the microphone sensor 203 (e) may characterize a level of detection of wind noise. The performance characteristic of the microphone sensor 203 (e) may characterize a level of detection of wind noise at a particular speed (which may be a speed of zero, i.e. when the vehicle is stationary) or range of speeds. An example of the performance characteristic may be the wind noise power level (measured as a ⅓ octave power spectrum over a frequency range from 500-1200 Hz) at a speed of 45 miles per hour.

As described further below, the autonomous vehicle model 103 may communicate by means of wireless communication with a remote computing device, and/or other vehicles. This communication may be by means of one or more communications modules 222 mounted on the roof of the autonomous vehicle. Each communications module 222 may comprise a cellular communications modem, and/or antennae, for example, for communicating via a long term evolution (LTE), or '4G', cellular network connection or via a 5G 'New Radio' (NR) cellular network connection. Collectively, the one or more communications module(s) 222 may implement one or more different cellular or wide area communications standards.

The autonomous vehicle model 103 may also comprise an external emitter array 218, which may generate human-perceptible signals such as audio and/or light signals. The emitter array 218 may comprise one or more acoustic array(s) and/or one or more light emitters and/or an exterior safety system, as disclosed in U.S. Pat. No. 9,630,619, which is hereby incorporated by reference in its entirety and for all purposes. The external emitter array 218 may be built-in to the autonomous vehicle model 103. There may be an instance of the external emitter array 218 located at each end of the autonomous vehicle model 103 to allow the autonomous vehicle model 103 to operate facing in either direction.

First and second 'host' vehicles 101, 102 are also shown in FIG. 1. These can be production models of non-autonomous vehicles or may be adapted (e.g. customized) versions of production models. For example, the host vehicles may be commercially available, non-autonomous vehicles which have been adapted to be operable in an autonomous mode. The host vehicles may have been adapted to incorporate one or more additional computer systems, as described in further detail herein. The first host vehicle 101 and second host vehicle 102 may be of the same design. For example, they may both be produced by a same vehicle manufacturer (e.g. Toyota), have a same model name (e.g. 'Highlander') and have a same model year. In some examples, the first host vehicle 101 and the second host vehicle 102 may be different models. For example, they may differ in manufacturer, model name and/or model year. The host vehicles may have a classification lower than a Level 5 classification defined by the U.S. National Highway Traffic Safety Administration, and in particular may have a classification associated with a vehicle which is not capable of performing all safety-critical functions for an entire trip and/or where occupants of the vehicle may be required to control the vehicle for some or all of the time. The first and second host vehicles may be vehicles which are operable in a non-autonomous manner under the control of a human occupant of the host vehicle.

A sensor platform 300 mountable on the first and second host vehicles 101, 102 comprises sensors 303, each of which is of a same modality as a respective sensor 203 of the autonomous vehicle. The sensors 303 may be arranged so that when the sensor platform 300 is mounted on either the first host vehicle 101 or the second host vehicle 102 then, for each sensor or group of sensors 303, a performance characteristic is similar to, or identical to, that of a corresponding sensor or group of sensors 203 of the autonomous vehicle model 103.

In an example, the performance characteristic is one or more of a resolution, dynamic range, emitted signal intensity and a sweep rate of the sensor(s). In an example, the performance characteristic of a LIDAR or RADAR sensor is an extent of a region within which a given object can be located such that a signal emitted by the sensor and reflected by the given object is detected by the sensor, in particular conditions. The region (hereafter 'detection region') for a particular sensor may be defined by reference to the vehicle itself, the surface (e.g. road) which the vehicle is on, or by reference to the region(s) associated with other similar sensors on the vehicle. The performance characteristic for a group of sensors 303 (such as the group of depth sensors 303 (*a*)-(*d*)) may be identical to that of a corresponding group of sensors 203 (such as the group of depth sensors 203 (*a*)-(*d*)) if the relative locations of the sensors 303 (*a*)-(*d*) relative to each other is the same as the relative locations of the respective sensors 203 (*a*)-(*d*) of the autonomous vehicle model 103. In an example, two or more of the sensors 303 may be located on the sensor platform 300 so that when the sensor platform 300 is mounted on a first host vehicle 101 or a second host vehicle 102, the locations of the two or more sensors 303 (*a*)-(*d*) relative to each other are the same as the locations of respective two or more sensors 203 (*a*)-(*d*) of the autonomous vehicle model 103, relative to each other. In examples, a second group of sensors, in this example four depth sensors 303 (*a*)-(*d*), are located at predetermined locations on the sensor platform 300. The sensor platform 300 is thus configured such that, when the sensor platform is mounted on a host vehicle, a detection region associated with the second group of sensors extends horizontally in all directions from the host vehicle. Further, when the sensor platform is mounted on a host vehicle, the locations of the second group of sensors, relative to each other on the sensor platform 300, is substantially the same as the locations of the sensors in the first group of sensors, relative to each other, on the autonomous vehicle model 103. The sensor platform 300 is further configured such that, when the sensor platform is mounted on a host vehicle, the locations of the second group of sensors, relative to a road surface, is substantially the same as the locations of the sensors in the first group of sensors, relative to the road surface, i.e. at approximately the same height as on the autonomous vehicle model 103. Preferably the sensor platform 300 is height adjustable such that, when the sensor platform is mounted on a host vehicle, the locations of the second group of sensors, relative to a road surface, can be adjusted to be substantially the same as the locations of the sensors in the first group of sensors as on the autonomous vehicle model 103.

Additionally, or alternatively, at least one of the sensors 303 and sensor platform 300 may be configured so that when the sensor platform 300 is mounted on a first host vehicle 101 or a second host vehicle 102, the locations of the at least one sensor 303 relative to the ground is the same as the location of a respective sensor 203 of the autonomous vehicle model 103, relative to the ground.

In some examples, the sensor platform 300 may comprise a microphone sensor 303 (*c*), such as a microphone array, corresponding to the microphone sensor 203 (*e*) of the autonomous vehicle model 103. Microphone sensor 303 (*e*) may be used to detect audio generated externally to the vehicles 101, 102. For example, the microphone 303 (*e*) of the sensor platform 300 may be configured to detect sirens of emergency vehicles.

For some sensor modalities, such as microphones, the performance characteristic may not be primarily (or at all) determined by the location of the sensor, in the sense that a particular performance characteristic may be achieved when the sensor is placed at one of multiple possible location. Nevertheless, the location and manner in which the sensor is attached to the vehicle may influence the performance characteristic. When the sensor is mounted directly to a host vehicle, extensive trial and error may be required to determine an appropriate location and mounting for the sensor to obtain the desired performance characteristic(s), depending on the model of the host vehicle. In accordance with examples of the present disclosure, such sensors are integrated on or in the sensor platform in a manner that allows the desired performance characteristic to be reliably obtained irrespective of the model of the host vehicle, thus simplifying the acquisition of data associated with the sensor modality when a host vehicle is being operated.

For example, to obtain a performance characteristic characterized by a level of detection of wind noise, a microphone which is directly mounted to a host vehicle may require additional custom fairings or wind shields to reduce the detection of wind noise, and/or may require the manufacture of custom mounting hardware to locate the microphone in a suitable location. In an example of the present disclosure, the microphone 303 (e) of the sensor platform 300 may be located in a particular location of the sensor platform 300, such as within a cavity (such as a hollow body as described in more detail below), or at a position where airflow turbulence is consistently low for different host vehicle models. Accordingly, a performance characteristic of the microphone sensor 303 (c) of the sensor platform 300 may be the same as or within a predetermined tolerance of that of the microphone sensor 203 (e) of the autonomous vehicle model 103, irrespective of the particular model of the host vehicle.

The performance characteristics of the microphone sensors 203 (e), 303 (c) may be similar when the wind noise power levels differ by less than a sensitivity threshold across a specified frequency range, when the autonomous vehicle is moving at, or below, a specified speed. The specified frequency range may be a range between 100-2000 Hz, for example from 500 to 1200 Hz. The sensitivity threshold may be between 1 dB and 20 dB, for example 5 dB of 10 dB. The specified speed may be between 10 and 70 miles per hour, for example 25 miles per hour or 45 miles per hour.

In an example, to substantially match the wind noise level of a microphone 203 (e) located within the body of the autonomous vehicle model 103, the microphone 303 (e) of the sensor platform 300 is located within the cavity 314.

In another example, the performance characteristic may comprise a signal to noise ratio.

A performance characteristic of a sensor may be whether a sensor complies with a particular performance requirement. For example, a performance characteristic of a sensor may be whether a signal to noise ratio for a particular desired signal and unwanted noise exceeds a predetermined threshold. In another example, a performance characteristic of a sensor may be whether a maximum detection range for a known object exceeds a predetermined threshold distance. Accordingly, sensors may have a same performance characteristic if both (or neither) satisfy the particular performance requirement.

Where a sensor has a detection capability across a range of frequencies (e.g. of light, RF transmissions, or sound), a performance characteristic of the sensor may be a frequency response, or a signal to noise ratio, of the sensor to signals over a specified frequency range or at a specific frequency. Where a sensor has a detection capability which may differs spatially (such as a directional microphone, or a camera with a limited field of view), a performance characteristic of the sensor may be a detection capability of the sensor to signals over a range of directions, or in a specific direction, where the direction may be relative to the vehicle, or to the ground.

Accordingly, sensor data acquired by sensors 303 of the sensor platform, when mounted on a host vehicle, can be reliably used as an input to the machine learning training process for developing the control system of the autonomous vehicle.

The sensor platform 300 may further comprise communications modules 322 as described in further detail below in the context of FIG. 3.

FIG. 1 illustrates a process, denoted by arrow 500, comprising the removal of the sensor platform 300, including the sensors 303, from the first host vehicle 101, and the installation of the sensor platform 300, including the sensors 303, on the second host vehicle 102.

Figure 2:
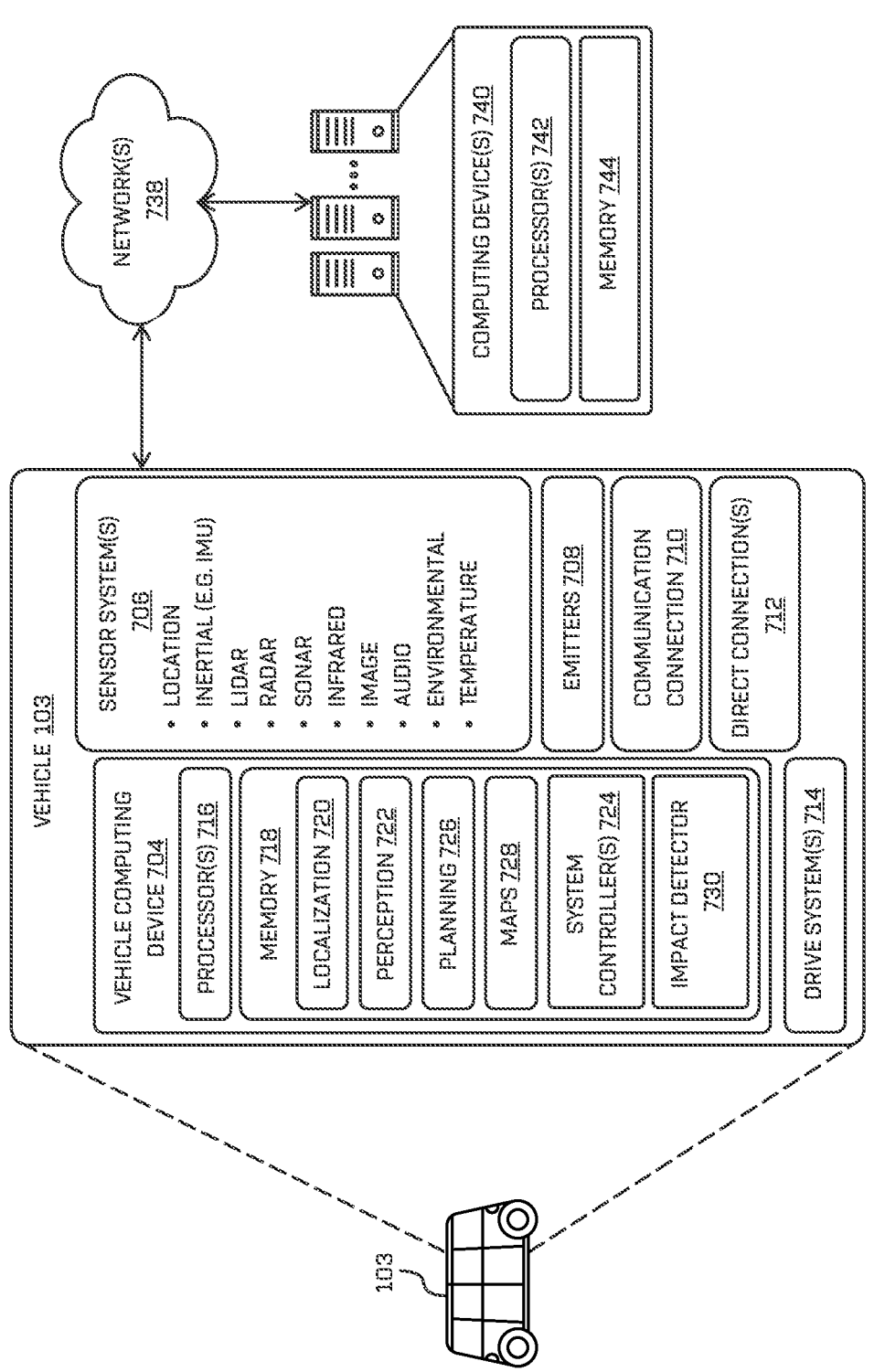
FIG. 2 depicts a block diagram of aspects of the example system for implementing the techniques described herein.

FIG. 2 depicts a block diagram of further aspects of the example system 100 for implementing the techniques described herein. As shown in FIG. 2, the autonomous vehicle model 103 can include autonomous vehicle computing device(s) 704, one or more sensors 706, one or more emitters 708, one or more communication connections 710, at least one direct connection 712 (e.g. for physically coupling the autonomous vehicle model 103 to exchange data and/or to provide power), and one or more drive systems 714. The sensors 203 of FIG. 1 may correspond to all, or a subset or, the sensors 706.

In some instances, the sensor(s) 706 may include light detection and ranging (LIDAR) sensors, RADAR sensors, ultrasonic transducers, sonar sensors, location sensors (e.g. global positioning system (GPS), compass, etc.), inertial sensors (e.g. inertial measurement units (IMUs), accelerometers, magnetometers, gyroscopes, etc.), cameras (e.g. red-green-blue (RGB), infrared (IR), intensity, depth, time of flight, etc.), microphones, wheel encoders, environment sensors (e.g. temperature sensors, humidity sensors, light sensors, pressure sensors, etc.), drive system sensors for torque and/or velocity sensing etc. The sensor(s) 706 may include multiple instances of each of these or other modalities of sensors. As another example, the cameras may include multiple cameras disposed at various locations about the exterior and/or interior of the autonomous vehicle model 103. The sensor(s) 706 may provide input to the autonomous vehicle computing device(s) 704.

The autonomous vehicle model 103 may also include the emitter(s) 708 for emitting light and/or sound. The emitter(s) 708 in this example may include interior audio and visual emitter(s) to communicate with passengers of the autonomous vehicle model 103. By way of example and not limitation, interior emitter(s) may include speakers, lights, signs, display screens, touch screens, haptic emitter(s) (e.g. vibration and/or force feedback), mechanical actuators (e.g. seatbelt tensioners, seat positioners, headrest positioners, etc.), and the like. The emitter(s) 708 in this example may also include exterior emitter(s), which may correspond to the external emitter array 218 of FIG. 1. By way of example and not limitation, the exterior emitter(s) in this example include lights to signal a direction of travel or other indicator of vehicle action (e.g. indicator lights, signs, light arrays, etc.), and one or more audio emitter(s) (e.g. speakers, speaker arrays, horns, etc.) to audibly communicate with pedestrians or other nearby vehicles, one or more of which comprising acoustic beam steering technology.

The autonomous vehicle model 103 may also include the communication connection(s) 710 that enable communication between the autonomous vehicle model 103 and one or more other local or remote computing device(s). For instance, the communication connection(s) 710 may facilitate communication with other local computing device(s) on the autonomous vehicle model 103 and/or the drive system(s) 714. Also, the communication connection(s) 710 may additionally or alternatively allow the autonomous vehicle model 103 to communicate with other nearby computing device(s) (e.g. other nearby vehicles, traffic signals, etc.). The communication connection(s) 710 may additionally or alternatively enable the autonomous vehicle model 103 to communicate with a computing device 736. The communication connection(s) 710 may be provided in part or entirely by the communications module(s) 222 shown in FIG. 1 and described above.

The autonomous vehicle computing device(s) 704 can include one or more processors 716 and memory 718 communicatively coupled with the one or more processors 716. In the illustrated example, the memory 718 of the autonomous vehicle computing device(s) 704 stores a localization component 720, perception component 722, a planning component 724, one or more maps 726, and one or more system controllers 728. The memory 718 may also include an interaction detector 730. The interaction detector 730 may be configured to monitor output voltages from the one or more interaction sensors, as part of a main control unit, and determine whether a low-level interaction has taken place. Though depicted in FIG. 2 as residing in memory 718 for illustrative purposes, it is contemplated that the localization component 720, the perception component 722, the planning component 724, the one or more maps 726, and the one or more system controllers 728 may additionally, or alternatively, be accessible to the autonomous vehicle model 103 (e.g. stored remotely). To the extent each are present, the localization component 720, the perception component 722, the planning component 724, the one or more maps 726, and the one or more system controllers 728 may be collectively referred to herein as an autonomous vehicle control component.

In some instances, the localization component 720 may be configured to receive data from the sensor(s) 706 to determine a position and/or orientation of the autonomous vehicle model 103 (e.g. one or more of an x-, y-, z-position, roll, pitch, or yaw). For example, the localization component 720 may include and/or request/receive a map 726 of an environment and may continuously determine a location and/or orientation of the autonomous vehicle within the map 726.

In some instances, the perception component 722 can include functionality to perform object detection, segmentation, and/or classification. In some examples, the perception component 722 can provide processed sensor data that indicates a presence of an entity that is proximate to the autonomous vehicle model 103 and/or a classification of the entity as an entity type (e.g. car, pedestrian, cyclist, animal, building, tree, road surface, curb, sidewalk, unknown, etc.). In additional or alternative examples, the perception component 722 can provide processed sensor data that indicates one or more characteristics associated with a detected entity (e.g. a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g. a roll, pitch, yaw), an entity type (e.g. a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In some instances, the planning component 724 may determine a location of a user. Further, the planning component 724 may determine a pickup location associated with a location. A pickup location may be a specific location (e.g. a parking space, a loading zone, a portion of a ground surface, etc.) within a threshold distance of a location (e.g. an address or location associated with a dispatch request) where the autonomous vehicle model 103 may stop to pick up a passenger.

In some instances, the one or more maps 726 may be used by the autonomous vehicle model 103 to navigate within the environment. A map may be any number of data structures modeled in two dimensions, three dimensions, or N dimensions that can provide information about an environment, such as, but not limited to, topologies (such as intersections), streets, mountain ranges, roads, terrain, and the environment in general. In some examples, multiple maps 726 may be stored based on, for example, a characteristic (e.g. type of entity, time of day, day of week, season of the year, etc.). Storing multiple maps 726 may have similar memory requirements but increase the speed at which data in a map may be accessed.

In at least one example, the autonomous vehicle computing device(s) 704 can include one or more system controllers 728. The system controller 728 can be configured to control steering, propulsion, braking, safety, emitters, communication, and other systems of the autonomous vehicle model 103. The system controller(s) 728 can communicate with and/or control corresponding systems of the drive system(s) 714 and/or other components of the autonomous vehicle model 103. The system controller(s) 728 may be communicatively coupled to one or more of the vehicle sensor(s) 706.

The drive system(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g. lighting to illuminate an exterior surrounding of the vehicle), and one or more other systems (e.g. cooling system, safety systems, onboard charging system, other electrical components such as a DC/DC converter, a high voltage junction, a high voltage cable, charging system, charge port, etc.). Additionally, the drive system(s) 714 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 714. Furthermore, the drive system(s) 714 may also include one or more communication connection(s) that enable communication by the respective drive system with one or more other local or remote computing device(s).

In some examples, the autonomous vehicle model 103 can send operational data, including raw or processed sensor data from the sensor(s) 706, to one or more computing device(s) 740 via the network(s) 738. The one or more computing device(s) 740 may comprise one or more processors 742 and memory 744. The one or more computing devices 740 may be remote from the vehicle.

In some instances, aspects of some or all of the components discussed herein may include any models, algorithms, and/or machine learning algorithms. For example, the component(s) in the memory 718, 744 may be implemented as a neural network. As can be understood in the context of this disclosure, a neural network can utilize machine learning, which can refer to a broad class of such algorithms in which an output is generated based on learned parameters.

Figure 3:
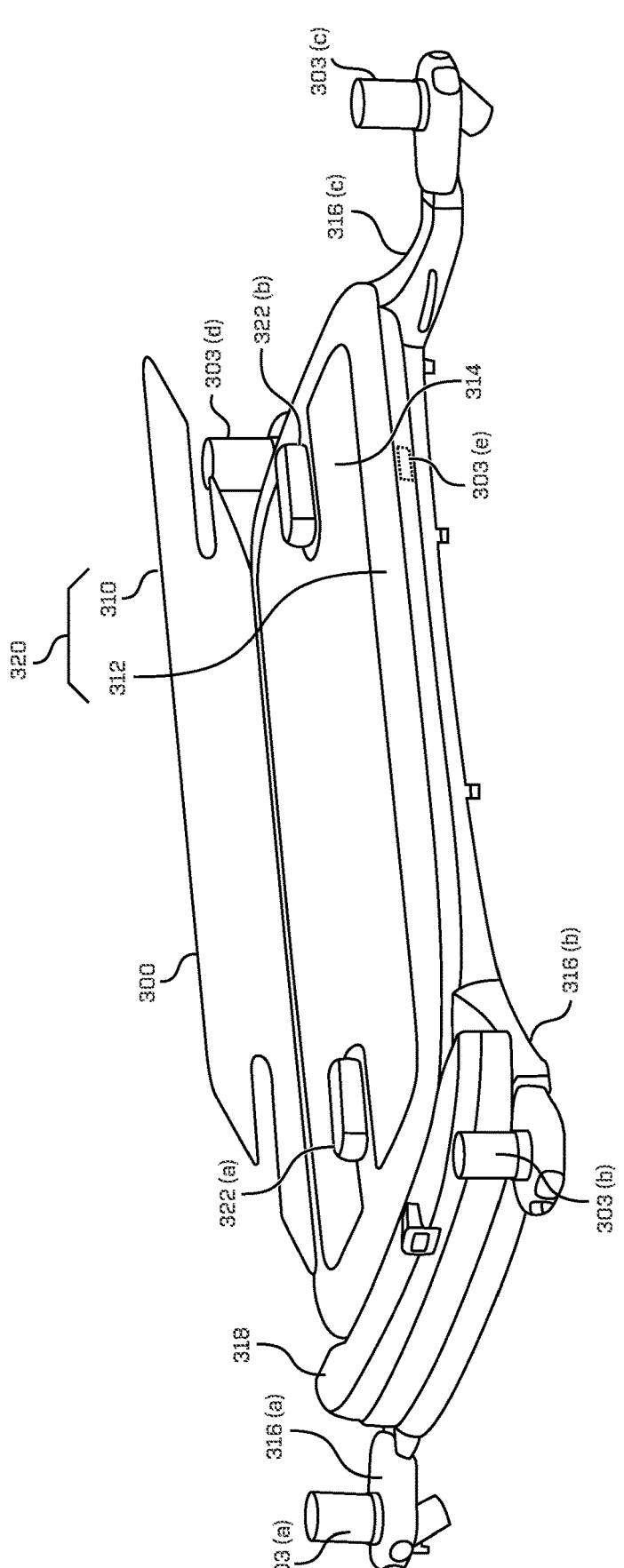
FIG. 3 illustrates further details of a sensor platform in accordance with the present disclosure.

FIG. 3 illustrates further details of the sensor platform 300 in accordance with the present disclosure. Certain features shown in FIG. 3 are the same as (and denoted by like reference signs) corresponding features shown in FIG. 1 and described above. Their description is omitted for conciseness.

The sensor platform may comprise a platform body 320 which defines a cavity 314. For example, the platform body 320 may comprise a hollow body portion 312, and a lid portion 310 which can be secured to the hollow body portion 312. One or both of the lid portion 310 and hollow body portion 312 may comprise a seal which is capable of scaling the lid portion 310 to the hollow body portion 312, so that when the lid portion 310 is secured to the hollow body portion 312, the ingress of water (e.g. from rain) between the lid portion 310 and the hollow body portion 312, into the cavity 314 is prevented.

The platform body 320 may comprise mounting points for allowing the attachment of the sensor platform 300 to a roof of the host vehicle 101, 102 by means of fasteners. The mounting points may comprise holes, which may be elongated, as further described herein.

One or more of the sensors 303 (*a*)-(*d*) may be mounted on respective sensor supports 316. The sensor supports 316 may be rigidly coupled to the platform body 320. The sensor supports 316 may be hollow. Respective cables (not shown in FIG. 3) may pass through the sensor supports 316. One end of each cable may be connected to a respective sensor 303 (*a*)-(*d*). In some examples, each sensor 303 (*a*)-(*d*) is comprised within a respective sensor pod. Each sensor pod may be removably coupled to the platform body 320, for example by means of respective sensor supports 316. In some examples, the sensor pod may comprise a supply harness which provides one or more of power, control signals, and/or cleaning fluids to the sensor pod from the platform body 320. In examples, the supply harness or another harness (not shown) provides data signals from the sensors to the platform body 320. In examples, the supply harness includes a fluid and pressurized air connection to supply fluid and pressurized air to the cleaning system (if present) and a power connection to supply power to one or more of the sensors.

The sensor platform 300 may comprise an emitter array 318. The emitter array 318 may generate human-perceptible signals, such as audio and/or light signals in response to emitter array control signals received from generated by the host vehicle computing device 600. The emitter array 318 may comprise one or more acoustic array(s) and/or one or more light emitters and/or an exterior safety system, as disclosed in U.S. Pat. No. 9,630,619. The host vehicle computing device 600 may operate as a vehicle controller to generate emitter array control signals which may comprise exterior data, as disclosed in U.S. Pat. No. 9,630,619. The emitter array 318 may be configured to generate signals similar to, or identical to, signals generated by the corresponding external emitter array 218 of the autonomous vehicle model 103. Accordingly, members of the public in a particular location can become acclimatized to the use of audio and/or light signals as generated by the autonomous vehicle model 103, when a host vehicle 101, 102 on which the sensor platform 300 is mounted is used in that location.

The sensor platform may comprise one or more communications modules 322. Each communications module 322 may comprise a communications modem for a cellular or other wide area communications network, and/or antennae, for example, for communicating via a long term evolution (LTE), or '4G', cellular network connection or via a 5G 'New Radio' (NR) cellular network connection. Collectively, the one or more communications module(s) 322 may implement one or more different cellular or wide area communications standards.

Figure 4:
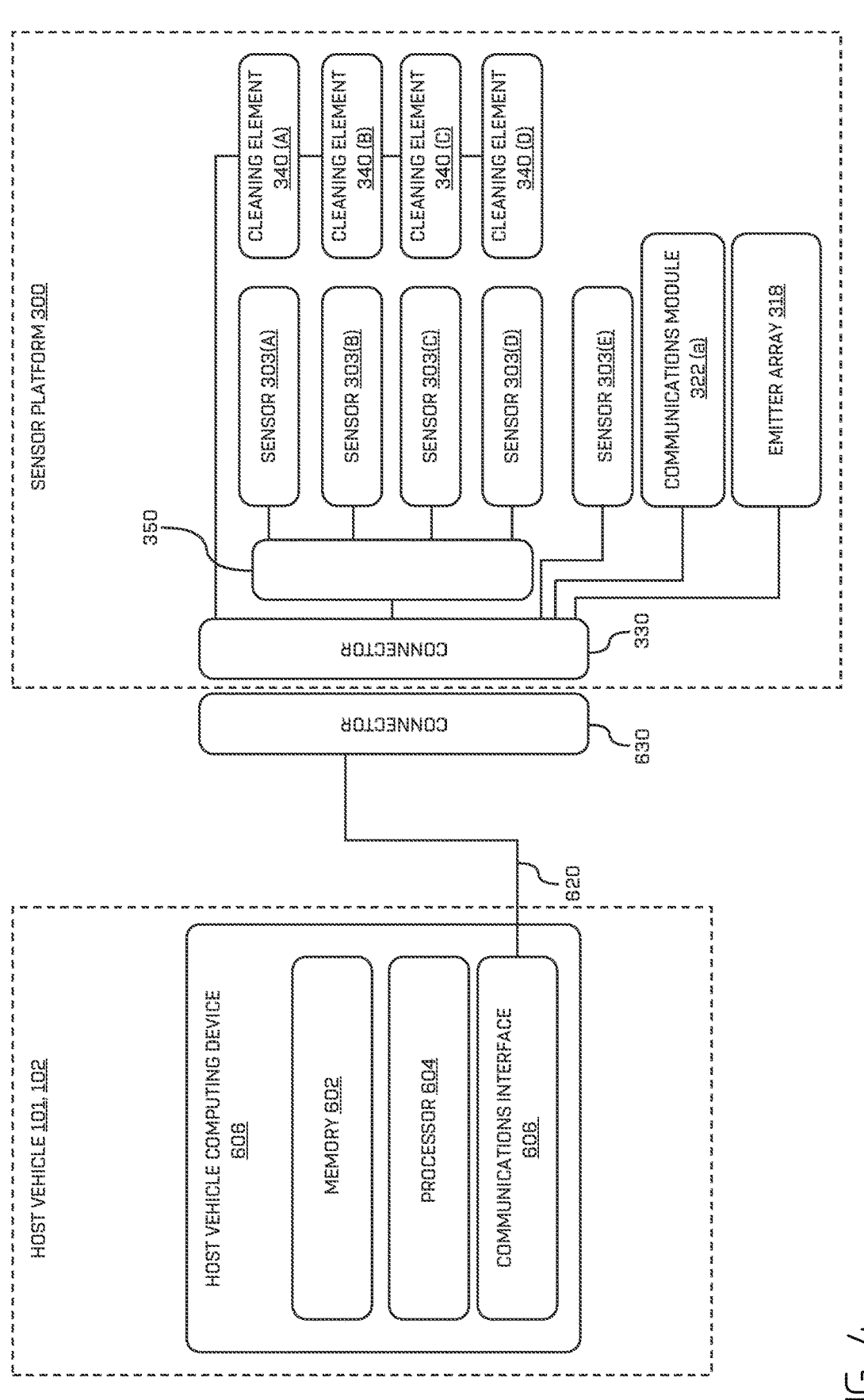
FIG. 4 is a block diagram of further aspects of the example system for implementing the techniques described herein.

FIG. 4 shows a block diagram of further aspects of the example system 100 for implementing the techniques described herein. As shown in FIG. 4, when the sensor platform 300 is mounted on a host vehicle, a host vehicle computing device 600 of the host vehicle is connected to the sensors 303 and, if present, the emitter array 318. The host vehicle computing device 600 may comprise a memory 602 and a communications interface 606 communicatively coupled to a processor 604.

Sensor data generated by the sensors 303 is transmitted to the host vehicle computing device 600. The data may be transmitted via one or more cables, as will be described further below. In some examples, the sensor data may be communicated via a wireless communications connection, such as in accordance with IEEE 802.11 ("Wi-Fi") or Bluetooth standards. Similarly, emitter array control signals for controlling the emitter array 118 may be transmitted from the host vehicle computing device 600 to the emitter array 118 via one or more cables and/or via a wireless communications connection.

In some examples, the sensor platform 300 comprises the host vehicle computing device 600. For example, the host vehicle computing device 600 may be located within the cavity 314 of the sensor platform 300 illustrated in FIG. 3. A power cable (not shown) may provide electrical power from the host vehicle 101, 102 to the host vehicle computing device 600. In some examples, both the sensor platform 300 and the host vehicle 101, 102 comprise computing devices 600. In such examples, some of the functions and components described herein as being carried out by or stored within the host computing device 600 may be stored within or carried out by the computing device of the sensor platform 300, and other functions described herein as being carried out by or stored within the host computing device 600 may be carried out by or stored within the computing device of the host vehicle 101, 102. Accordingly, the required capability for a computing device within the host vehicle 101, 102 can be reduced or eliminated, and the modifications to the host vehicle 101, 102 to accommodate a computing device 600 can be correspondingly reduced or avoided.

In a particular example, a perception component similar to the perception component 722 described above, may be stored in the computing device of the sensor platform 300. In an example, a planning component, similar to the planning component 724 described above may be stored in the computing device of the sensor platform 300. The storage of certain components on the sensor platform, such as the planning component and the perception component, may reduce the amount of sensor data which is conveyed to the host vehicle 101, 102. Accordingly, connectors and harnesses for conveying sensor data between the sensor platform 300 and the host vehicle 101, 102 can be reduced or simplified.

In some examples, each host vehicle 101, 102 may comprise a respective host vehicle computing device 600. Alternatively, the system 100 may comprise a single host vehicle computing device 600 which is mountable in, and removable from, each host vehicle 101, 102, and may be fitted to a host vehicle having the sensor platform 300 mounted on it.

Where cables are used to convey sensor data or emitter array control signals between the sensor platform 300 and a host vehicle computing device 600 mounted within a host vehicle 101, 102, connectors 330, 630 may be provided to facilitate the mounting and removal of the sensor platform 300.

In the example illustrated in FIG. 4, the sensor platform 300 comprises a connector 330. The connector 330 may be located within the cavity 314 of the sensor platform 300. If the connector 330 is located within the cavity 314, then removing the lid portion 310 from the hollow body portion 312 may permit access to the connector 330 while the sensor platform 300 is mounted on the host vehicle 101, 102. A cable harness 620 comprising one or more cables extending from the host vehicle 101, 102, is terminated with a connector 630 at a distal end (relative to the host vehicle) of the harness 620. In a mounting operation of the sensor platform 300, the connector 620 of the cable harness 620 and the connector 330 of the sensor platform 300 are mated, thereby providing connectivity between the host vehicle computing device 600 and the sensors 303 and/or emitter array 318. This process may comprise the steps of feeding the distal end of the cable harness 620 into the cavity 314 of the sensor platform (e.g. via a hole in the hollow body portion 312) and the connectors 630, 330 being mated together. When the platform is secured (e.g. when the lid portion 310 is secured to the hollow body portion 312) the connectors may be inaccessible. Accordingly, the security and integrity of the sensor data and emitter array control signals can be improved.

In another example, the sensor platform 300 may comprise a cable harness comprising one or more cables extending from the platform body 320. The cable may be terminated with one or more connectors at a distal end relative to the platform body 320. In a mounting operation of the sensor platform 300, the distal end of the cable is fed into the host vehicle 101, 102 and the one or more connectors mated with corresponding connectors providing connectivity to the host vehicle computing device 600 within the host vehicle 101, 102. The connectors can thus be secured within the host vehicle (for example, by locking the doors of the host vehicle), thereby improving the security and integrity of the sensor data and emitter array control signals.

In the example of FIG. 4, a single pair of connectors and single cable harness is shown, providing transmission capability for the signals from all sensors 303 and to the emitter array 318. In some examples, two or more connector pairs may be provided, together with corresponding cable harness. In general, there may be fewer connector pairs than there are sensors. The sensor platform 300 may comprise digital multiplexing circuitry 350 configured to combine the sensor data from multiple sensors, for example by providing a parallel-to-serial conversion of data from multiple sensors or by multiplexing the sensor data. The output of the digital multiplexing circuitry 350 may be connected to the connector 330 of the sensor platform 330. In some examples, the digital multiplexing circuitry may process digital sensor data received from multiple sensors via respective communications links (e.g. signaling cable providing one or more signal paths) and generate an output that can be conveyed using a single signal path (e.g. using a single pair of connectors). In general, the digital multiplexing circuitry may receive sensor data via a first number of signal paths (e.g. one per sensor) and generate signals representing the sensor data which are output a second number of signal paths, the second number being lower than the first number. Accordingly, the connector(s) and cable harness providing the communications link from the sensor platform 300 to the host vehicle 101, 102 can be significantly simplified. In the example of FIG. 4, the digital multiplexing circuitry 350 combines sensor data from sensors 303 (*a*)-(*d*) and generates a single output via a single signal path. Accordingly, sensor data can be conveyed using fewer connector pairs and cables than if data from each sensor were conveyed using a separate connector pair and cable In some examples, there may be multiple instances of digital multiplexing circuitry 350.

In some examples, the cable harness(es) 620 and connector pair(s) may convey power from the host vehicle to provide power to the electrically-powered equipment within the sensor platform (such as the sensors 303, cleaning elements 340, and communications module 322) and/or may convey data for communications with a remote compute system by the communications module 322.

As described above, in some examples, the platform body 320 may comprise a hole through which a cable harness (such as cable harness 620 shown in FIG. 4) can pass. In some embodiments, the hole may be formed in a lower face of the platform body 320 to prevent the ingress of precipitation (e.g. rain, snow, sleet) into the cavity. There may be provided in the roof (or elsewhere) of the host vehicle 101, 102, a corresponding hole through which the cable harness can pass.

In some examples, such as the example of FIG. 4, the sensor platform 300 comprises a cleaning system to clean one or more of the sensors 303. The cleaning system may comprise one or more cleaning elements 340, each of which is associated with a respective sensor 303 and may be activated to clean the respective sensor. In examples, the cleaning elements 340 may comprise nozzles that are directed at the sensors 303. Activating the cleaning elements 340 may then cause compressed gas, such as air, to be emitted from the nozzles to clean the sensors. In examples where the cleaning elements comprise nozzles that emit compressed gas, the cleaning system may comprise a tank that stores compressed gas, and a compressor to charge the tank, not shown in FIG. 4. In an example, the tank and compressor may be located within the platform body 320. Cleaning elements associated with sensors mounted on sensor supports 316 may be integral to, or supported on, the sensor supports 316. In some examples, a cleaning element 340 may form an integral part of a sensor pod, as disclosed in US 2021/0339685 A1.

In an example such as that shown in FIG. 4, a cleaning system controller which is responsible for activating the cleaning elements is implemented by the host vehicle computing device 600 located within the host vehicle 101, 102. The cleaning elements 340 may be connected to the cleaning system controller by means of connectors 630, 330 and cable harness 620.

In other examples, the sensor platform 300 may comprise a separate cleaning system controller. The separate cleaning system controller may comprise one or more processors and one or more non-transitory storage media. The storage media may store instructions which, when executed by the one or more processors, perform operations, techniques, features and/or functionality in relation to the cleaning system controller.

The operation of the cleaning system and cleaning system controller may be in accordance with the disclosure of co-pending U.S. patent application Ser. No. 17/540,051, the contents of which are hereby incorporated by reference in their entirety for all purposes.

The sensor platform 300 is configured to be mountable onto, and removable from, the first host vehicle 101 and the second host vehicle 102. The sensor platform 300 may be directly mountable to a host vehicle by means of one or more fasteners which secure the platform body 320 to a roof of a host vehicle. The fastener(s) prevents the sensor platform 300 from separating from the host vehicle 101, 102 while the host vehicle is moving.

Figure 5A:
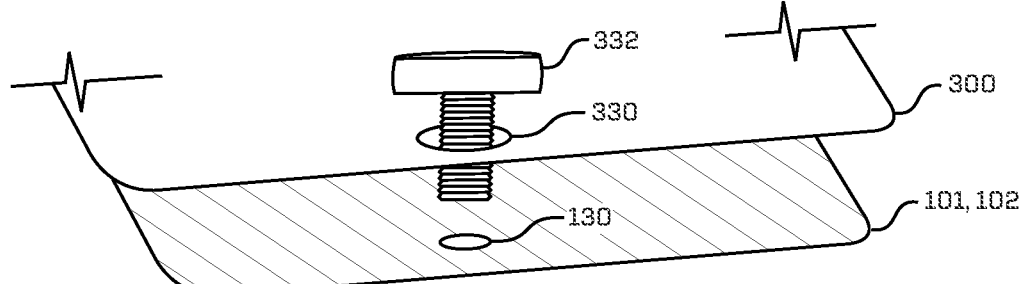
FIG. 5A, FIG. 5B and FIG. 5C illustrate examples of fasteners and an intermediate adaptor in accordance with the present disclosure.
Figure 5B:
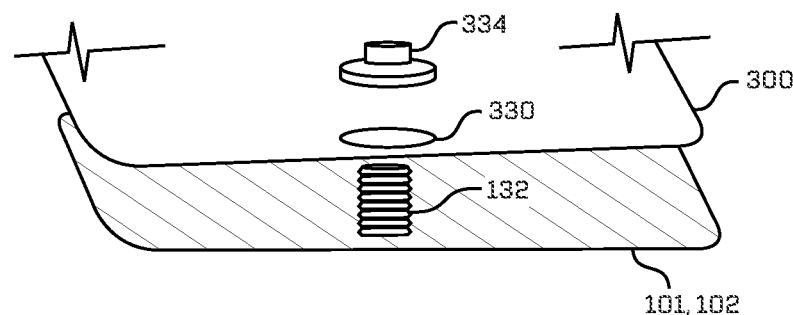

FIG. 5A and FIG. 5B illustrate examples of fasteners in accordance with the present disclosure. As shown in FIG. 5A, a fastener may comprise a threaded bolt 332 which passes through respective hole 330 in the sensor platform 300 and is received in a respective threaded bolt hole 130 in the roof of the host vehicle 101, 102. The hole 330 may be located in a lower surface of the hollow body portion 312.

Another type of fastener may comprise a threaded rod or bolt 132 which protrudes from the host vehicle 101, 102, as shown in FIG. 5B. A hole 330 in the sensor platform 300 receives the threaded rod or bolt 132, and the sensor platform 300 is secured by means of a threaded nut 334 which is threaded onto the threaded rod or bolt 132.

Holes 330 in the sensor platform 300 may be elongated to accommodate variation in the location of bolt holes 130 and/or threaded rods or bolts 132 between different host vehicles 101, 102, and/or to allow for an adjustment of the position of the sensor platform 300 with respect to the host vehicle. The sensor platform 300 can accordingly be mounted on, and accurately aligned with, host vehicles of different types. In some examples, the number of holes 330 in the sensor platform 300 may exceed the number of threaded rods or bolts 132 and/or threaded holes 130 in a host vehicle 101, 102. A first subset of the holes 330 in the sensor platform 300 may be used to secure the sensor platform 300 to the first host vehicle 101, the first subset corresponding to and aligned with the threaded rods or bolts 132 and/or threaded holes 130 of the first host vehicle 101. A second subset of the holes 330 in the sensor platform 300 may be used to secure the sensor platform 300 to the second host vehicle 102.

Figure 5C:
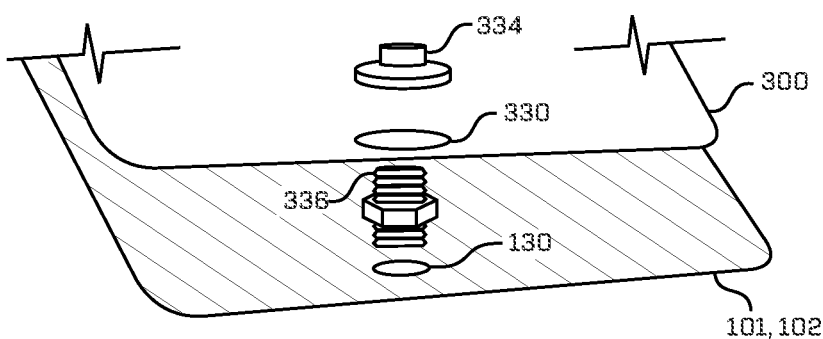

FIG. 5C illustrates the use of an intermediate adaptor 336 which is mountable on one or more models of host vehicle. The intermediate adaptor 336 may be secured to the host vehicle, for example by using one or more threaded rods or bolts 132 and/or threaded holes 130 of the host vehicle. The sensor platform 300 is mountable on the intermediate adaptor 336 either before, or after the intermediate adaptor(s) 336 are secured to the host vehicle. The mounting of the sensor platform on the intermediate adaptor(s) 336 may be by any suitable fastening technique. For example, the intermediate adaptor(s) may comprise threaded rods or bolts and/or threaded holes, and the sensor platform 300 may comprise respective corresponding mounting holes. A threaded rod or bolt on an intermediate adaptor may be passed through a corresponding mounting hole and, optionally, secured by means of a threaded nut. A bolt may be passed through a hole of the sensor platform 300 and secured in a threaded hole of the intermediate adaptor. In the example of FIG. 5C, the intermediate adaptor 336 comprises a pair of threaded rods, a first threaded rod configured to be secured in a corresponding threaded mounting hole 130 of the host vehicle 101, 102, and the second configured to pass through a corresponding mounting hole 330 of the sensor platform 300. The sensor platform is secured by means of the application of internally-threaded nut 334 to the second threaded rob. The first and second threaded rods may share a common extended axis.

When secured to the host vehicle, the intermediate adaptor 336 allows the sensor platform 300 to be indirectly secured to the host vehicle 101, 102. In some examples, a single intermediate adaptor is provided, which is secured to the host vehicle by means of a two or more fasteners, and the sensor platform 300 is secured to the single intermediate adaptor.

In some examples, multiple intermediate adaptors 336 are provided for mounting, indirectly, the sensor platform 300 to a host vehicle of a particular model. Each intermediate adaptor is secured to the host vehicle 101, 102, and the sensor platform 300 is secured to the intermediate adaptors. In some examples, the sensor platform 300 is secured to the host vehicle by means of a combination of direct connection using one or more fasteners such as those described above and illustrated in FIG. 5A and FIG. 5B, and by means of one or more intermediate adaptors 336 as illustrated in FIG. 5C.

In a particular example, the host vehicle 101, 102 comprises eight threaded holes 130 arranged in two rows on the roof of the host vehicle 101, 102. The sensor platform 300 comprises at least eight holes 330, of which eight are aligned with the threaded holes 130 of the host vehicle. Eight intermediate adaptors 336 are provided which are used to secure the sensor platform 300 to the host vehicle as shown in FIG. 5C and described above. In general, the sensor platform 300 may comprise more holes 330 than are required to secure the sensor platform 300 to a host vehicle, and a different subset of holes is used for different host vehicles either with or without an intermediate adaptor 336, the subset being depending on the model of the host vehicle.

In a system according to the present disclosure there may be different intermediate adaptors 336 mountable to different host vehicle models for allowing the indirect mounting of the sensor platform 300 to host vehicles which are of different models. In some examples the sensor platform 300 is mountable directly to a host vehicle of a first model, and is mountable indirectly, via one or more intermediate adaptors to a host vehicle of a second model. In general, the nature and use of the fasteners and the nature and use of any intermediate adaptor(s) used for securing the sensor platform 300 to the host vehicle 101, 102 may vary according to the model of the vehicle.

Accordingly, a single sensor platform 300 can be secured to, and used with, a variety of models of host vehicle 101, 102.

Above, example fasteners have been described. However, it will be appreciated that other fasteners may be used to secure a sensor platform 300 to a host vehicle, whether directly or via an intermediate adaptor. In some examples, one or more such fasteners may be lockable, for example by means of a key or locking nut, to prevent unauthorized removal of the sensor platform from the host vehicle.

In some examples, an alignment of the sensor platform 300 with respect to the host vehicle 101, 102 is adjustable. This adjustment may be applied in a vertical direction, for example, by the use of a different number of spacer washers together with the fasteners described above. By adding or removing spacer washers between the host vehicle and the sensor platform 300, a height of the sensor platform, relative to the host vehicle, can be increased or decreased. Additionally, or alternatively, a lateral adjustment of the sensor platform may be carried out by sliding the sensor platform so that the fasteners pass through a different area of a respective elongated hole 330 in the sensor platform. Once the correct lateral alignment has been determined, the fasteners can be secured to prevent subsequent movement of the sensor platform relative to the host vehicle.

In some examples, the host vehicle computing device 600 receives data from the sensors 303 of the sensor platform 300. The host vehicle computing device 600 may process (e.g. compress) the sensor data and store the results of the processing on the storage medium 608. In some examples, the host vehicle computing device 600 may comprise a second communications interface, by which the sensor data (which may have been processed) may be communicated to a remote compute system (not shown in FIG. 4), which may be the computing device(s) 740 illustrated in FIG. 2. In some examples, as shown in FIG. 4, the sensor platform 300 comprises a communications module 322 (*a*) may comprise a communications modem for a cellular or other wide area communications network, and/or antennae, for example, for communicating via a long term evolution (LTE), or '4G', cellular network connection or via a 5G 'New Radio' (NR) cellular network connection. The communications module 322 (*a*) may be substantially the same as the communications modules 222 of the autonomous vehicle model 103.

The sensor data acquired from the sensor platform may be associated with additional data, such as location data, speed, heading, or other information relating to the host vehicle 101, 102. For example, the additional data may be acquired from global positioning system (GPS) circuitry which is integral to the host vehicle 101, 102. In an example, the sensor platform 300 comprises a GPS system or elements (e.g. antenna) for a GPS system. The GPS antenna may be mounted within, or together with, the communications module 322.

The acquired sensor data and, in some examples, the additional data, may be used as inputs to a machine learning training process to develop, or improve, the autonomous vehicle control component. Because the performance of each of the sensors 303 of the sensor platform matches, in at least some respects, that of respective sensors 203 of the autonomous vehicle model 103, the sensor data may in some examples be treated as if it had been acquired by the autonomous vehicle model 103.

In some examples, a pre-processing step may be applied to the sensor data, in order to compensate for any differences between the sensors of the sensor platform 300 and the sensors of the autonomous vehicle model 103. Alternatively, or additionally, the machine learning training process may be adapted to use sensor data from the sensor platform in a different manner from the sensor data acquired from the autonomous vehicle. Accordingly, a performance characteristic of a sensor of the sensor platform 300 can be adjusted by such pre-processing or specific manner of use to be within a predetermined threshold of the performance characteristic of a corresponding sensor of the autonomous vehicle. Note that in some examples, such pre-processing may comprise degrading the sensor data (e.g. by introducing additional noise, or by discarding some portion of the sensor data).

As an example, the sensor data acquired from the sensor platform 300 may be processed based on a difference in a geometry of the host vehicle 101, 102 (with respect to the location of sensors 303 of the sensor platform), compared with a geometry of the autonomous vehicle model 103 (with respect to the location of sensors 203 of the autonomous vehicle). For example, as shown in FIG. 1, the forward (leading) edge of the host vehicle 101, 102 may be significantly in front of the forward sensors 303 (*a*)-(*b*) of the sensor platform. Accordingly, these sensors 303 (*a*)-(*b*) may obtain data which differs from data that would be acquired, in the same scenario, from corresponding forward sensors of the autonomous vehicle model 103 (which may be sensors 202 (*a*)-(*b*) if the autonomous vehicle is travelling from right to left in FIG. 1). For example, if the sensors 303 (*a*)-(*b*), 202 (*a*)-(*b*) are depth sensors capable of detecting solid objects, then the forward sensors 303 (*a*)-(*b*) of the sensor platform may always detect an object (specifically, the front of the host vehicle) in a region immediately forward of the sensors corresponding to the front of the host vehicle, whereas the forward sensors of the autonomous vehicle would rarely detect an object in the same region.

Accordingly, in some examples, prior to, or as part of, the training process, sensor data acquired from the sensor platform 300 which is associated with this region immediately in front of the forward sensors may be adjusted or may be given reduced or no weight in the machine learning training process.

In another example, where the location of the sensor 303 differs (e.g. with respect to a road surface) from that of a sensor 203, the sensor data from sensor 303 may be adjusted accordingly to compensate for this difference. In another example, where the sensor 303 detects signals spanning a range of frequencies (e.g. audio or RF signals such as light) the frequency response of the sensor 303 may differ from that of the corresponding sensor 203 of the autonomous vehicle model 103. In such a case, processing (e.g. the application of a filter) may be applied to the data from sensor 303 in order to compensate for the difference in frequency response.

It will be appreciated that other differences between a sensor of the sensor platform and a corresponding sensor of the autonomous vehicle may be compensated for in a suitable manner, either by pre-processing of the sensor data acquired from the sensor platform 300, or by an adaptation of the training process to treat the sensor data acquired from the sensor platform 300 in a first manner, and to treat the sensor data acquired from the autonomous vehicle model 103 in a second manner in order that a performance characteristic of a sensor (or group of sensors) of the sensor platform 300 matches, or differs by less than a predetermined threshold from, that of a corresponding sensor (or group of sensors) of the autonomous vehicle.

Accordingly, the autonomous vehicle control component may be developed or enhanced by using sensor data acquired from a sensor platform mounted on a host vehicle 101, 102, the sensor platform being mountable on, and removable from, two or more host vehicles.

The first and/or second host vehicles 101, 102 may semi-autonomous and in certain circumstances can operate in an autonomous mode, i.e. without requiring the active control by a human operator. In such an example, the host vehicle computing device 600 may be located within the host vehicle and may implement a host vehicle control component to generate, in response to sensor data received from the sensors 303, control signals for controlling aspects of the host vehicle, such as its motor, brakes, and steering. In an example, the host vehicle control component may be an adapted version of the autonomous vehicle control component, adapted to account for differences in the drivetrain, wheels, and steering mechanism between the host vehicle 101, 102 and the autonomous vehicle model 103, and corresponding differences in the nature of the control signals. For example, the autonomous vehicle model 103 may comprise four separate motors which each drive a respective wheel and may have independent steering for each wheel, while the host vehicle 101, 102 may use a single engine coupled to two or four wheels, and a single steering control which applies only to the front two wheels. Nevertheless, the host vehicle control component may share significant functionality with the autonomous vehicle control component. The shared functionality may correspond to, for example, the perception component 722, the planning component 724, and the one or more maps 726 of the autonomous vehicle control component.

In such examples, the host vehicle control component may be developed or improved in a consistent manner with changes to the autonomous vehicle control component. Improvements to the autonomous vehicle control component, based on sensor data acquired from the sensors 303 of the sensor platform 300, may therefore be realized because the sensor data was acquired while the host vehicle 101, 102 was operating in accordance with a host vehicle control component sharing at least portions of functionality with the autonomous vehicle control component.

Figure 6:
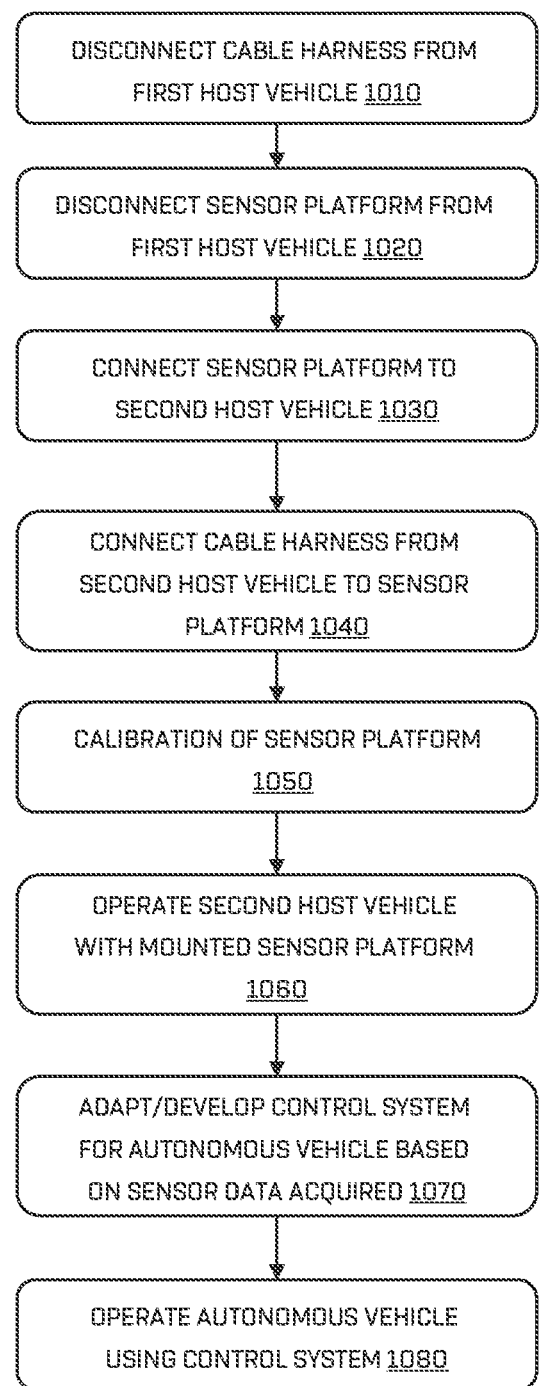
FIG. 6 is a flow chart for an example process in accordance with the present disclosure.

FIG. 6 shows a flow chart for an example process in accordance with the present disclosure. Prior to the start of the process shown in FIG. 6, the sensor platform 300 is mounted on the first host vehicle 101, and connectors of a cable harness and the sensor platform are coupled. Sensor data may have been communicated from the sensors 303 of the sensor platform 300 to the host vehicle computing device 600 located within the first host vehicle 101 via a cable harness 620 and connectors 630, 330 which are mated within the sensor platform 300.

Sensor data generated by, and acquired from, the sensors 303 of the sensor platform 300 may also be used as input to the host vehicle control component for controlling the movement of the first host vehicle 101, if the first host vehicle 101 is operating in an autonomous mode of operation.

In a first step 1010 of the process, the connectors 630, 330 are uncoupled. Accordingly, the cable harness 620 which extends from the first host vehicle may be retracted and, for example, secured within the first host vehicle 101. In some examples, a separate power connection, providing power to the sensor platform 300 from the first host vehicle 101, may be disconnected.

In a second step 1020, the sensor platform 300 is removed from the first host vehicle 101. This step may comprise the removal of fasteners 332, 334 from each of a plurality of mounting points of the sensor platform 300. Where the sensor platform 300 is mounted indirectly via one or more intermediate adaptors, the sensor platform 300 may be unfastened from the intermediate adaptor(s). The intermediate adaptor(s) may then be removed from the first host vehicle. In some examples, for example where the first and second host vehicles are the same model, the intermediate adaptor(s) may be removed from the first host vehicle while the sensor platform 300 is still attached to the intermediate adaptor(s), thereby simplifying the removal and mounting process.

In a next step 1030, the sensor platform 300 is mounted on the second host vehicle 102. This step 1030 may be substantially the reverse procedure of step 1020. In some examples, the mounting of the sensor platform 300 may comprise mounting one or more intermediate adaptors to the second host vehicle, followed by (or preceded by) the fastening of the sensor platform to the one or more intermediate adaptors.

As described above, the intermediate adaptors may permit the same sensor platform 300 to be mounted to host vehicles which are different models. Accordingly, the intermediate adaptors may be specific to one or more models of host vehicle.

At step 1040, connection between a host vehicle computing device 600 of the second host vehicle 102 and the sensors 303 of the sensor platform is established, by mating connector 330 of the sensor platform 300 with connector 630 of the cable harness 620 extending from the second host vehicle 102. Step 1040 may also comprise the provision of power to the sensor platform 300 by means of the connection of a power cable providing power from the second host vehicle to a corresponding connector of the sensor platform 300.

At step 1050, a calibration procedure may be carried out in respect of the sensors of the sensor platform. This may be based on sensor data or other measurements which are suitably calibrated. For example, the second host vehicle may be placed in a known environment and the acquired sensor data compared with known correct sensor data. Differences between the acquired sensor data and the known correct sensor data can be determined and appropriate compensatory adjustments determined for subsequently acquired sensor data. As part of, or separately from, the calibration procedure, an alignment procedure may be carried out to mechanically align the sensor platform with the second host vehicle 102.

At step 1060, the second host vehicle 102 is operated, e.g. driven, within a particular design domain and sensor data acquired from the sensors 303 of the sensor platform 300 is acquired at the host vehicle computing device 600 of the second host vehicle 102. The sensor data may be stored at the host vehicle computing device 600, used for the autonomous control of the second host vehicle 102, and/or communicated to a remote computer device such as the computing device(s) 740. Additional data acquired from the second host vehicle 102 directly (e.g. GPS location, engine speed) may be similarly stored and/or communicated together with the sensor data. The acquired data may be associated with the design domain. For example, the stored data may be labelled with the design domain.

At step 1070, the sensor data is used as training data for the development or adaptation of the autonomous vehicle control component to generate an 'updated autonomous vehicle control component'. In an example, the sensor data is used to train a machine learning model for forming part of the 'updated autonomous vehicle control component', the model being associated with the design domain in which the sensor data was acquired. In an example, the sensor data is used, together with an identification of the design domain, to train the machine learning model. Prior to, or as part of step 1070, the sensor data may be pre-processed, as described above, to mitigate or reduce differences between a performance characteristic of one or more sensors 303 of the sensor platform and that of the respective sensors 203 of the autonomous vehicle model 103. The pre-processing may be in accordance with compensatory adjustments determined at step 1050.

At step 1080, the updated autonomous vehicle control component is provisioned to an autonomous vehicle, being an instance of the autonomous vehicle model 103, and the autonomous vehicle is operated in accordance with the updated autonomous vehicle control component. In an example, the operation of the autonomous vehicle in accordance with the updated autonomous vehicle control component at step 1080 may comprise a determination that the autonomous vehicle is operating within the design domain referred to above in respect of step 1060. Step 1080 may accordingly comprise, in response to the determination that the autonomous vehicle is operating within the design domain, use of a machine learning model which has been trained based on the data acquired at step 1060 and/or providing as an input to the autonomous vehicle control component (or a component thereof) an indication of the design domain.

As an example, the design domain in which step 1060 occurs may be associated with a particular geographic region, such as the administrative boundary of a particular city. At step 1080, the autonomous vehicle may determine, based on location information acquired from a global positioning system (GPS) or other satellite-based or mobile telecommunications-based positioning system, that the autonomous vehicle is within the boundary of the particular city. In response, the autonomous vehicle may operate the updated autonomous vehicle control component in accordance with the determined location, for example, by using a model which has been trained using the sensor data acquired at step 1060.

In a further step (not shown in FIG. 6), where the first or second host vehicle comprises a host vehicle control system for autonomous driving, applicable elements of the updated autonomous vehicle control system may be used to generate an updated host vehicle control component, which is subsequently provisioned to one or both of the first and second host vehicles 101, 102.

The present disclosure is not limited to the configurations described above in relation to the process illustrated in FIG. 6, and it will be appreciated that the scope of the present disclosure includes processes where the configuration of the sensor platform 300 when mounted on either the first or second host vehicles may differ from that disclosed above in respect of the process of FIG. 6, and may be, for example, as described elsewhere herein.

In some examples, one or more of the steps of the process of FIG. 6 may be omitted and/or the steps may be performed in a different sequence. Steps in the process of FIG. 6 may be repeated and/or performed in parallel. For example, step 1070 may be followed by a further instance of step 1060, using the updated host vehicle control system. The process may comprise further steps of removing the sensor platform 300 from the second host vehicle 102 (broadly corresponding to steps 1010, 1020, but with respect to the second host vehicle 102) and carrying out steps 1030, 1040 and subsequent steps with respect to a further host vehicle (which may be the first host vehicle 101, or a different host vehicle). In another example, step 1070 may occur only after sensor data has been acquired from the sensors 303 of the sensor platform 300 when the sensor platform 300 has been mounted on two or more host vehicles. That is, steps 1010-1060 may be repeated in respect of the same sensor platform 300, and with different vehicles, prior to step 1070.

Accordingly, in an example process, first sensor data acquired from sensors 303 of the sensor platform 300 while the sensor platform is mounted on a first host vehicle 101, and second sensor data acquired from the sensors 303 of the sensor platform 300 while the sensor platform is mounted on a second host vehicle 102 may be used as input training data to a machine learning process for adapting or developing an autonomous vehicle control system, to generate an updated autonomous vehicle control system. The updated autonomous vehicle control system may be deployed to an instance of the autonomous vehicle model 103, and the autonomous vehicle may operate in accordance with the updated autonomous vehicle control system. The machine learning process may be implemented on a computer system such as the computer system 740.

Similarly, the scope of the present disclosure is not limited to the arrangement and modalities of sensors as shown in FIG. 1, FIG. 3 and FIG. 4 and described herein. For example, in some examples, different numbers and/or different modalities of sensors may be present, and their arrangement with respect to any sensor pods may be different. For example, in some examples, there may be two or more sensors within a single sensor pod. In some examples, one or more sensors may not be within any sensor pod. In some examples, the arrangement of sensors within pods may be the same on the sensor platform as on the autonomous vehicle. In other examples, there may be no sensor pods on the sensor platform. In other examples, one or more sensor pods on the sensor platform may house fewer or different sensors than corresponding sensor pods on the autonomous vehicle.

A. A method, comprising: collecting, by a sensor platform mounted to a first vehicle operating in an environment, sensor data generated by a first group of sensors mounted on a sensor platform, wherein the sensor platform is removably mounted on the first vehicle, a first detection region associated with the first group of sensors extends horizontally in all directions from the first vehicle, and the first vehicle is operable in a non-autonomous manner under the control of a human occupant of the host vehicle, training, based at least in part on the sensor data, a machine-learned model for use by a purpose-built autonomous vehicle, wherein the purpose-built autonomous vehicle includes a second group of sensors comprising two or more sensors each corresponding in modality, location and orientation to one of the sensors of the first group of sensors, a second detection region associated with the second group of sensors extending horizontally in all directions from the purpose-built autonomous vehicle, each of the second group of sensors mounted within a different respective sensor pod, each respective sensor pod comprising one or more sensors and being removably mounted on the autonomous vehicle; and operating the purpose-built autonomous vehicle in the environment using the trained machine-learned model.

B. The method as paragraph A describes, wherein the purpose-built autonomous vehicle comprises a first microphone, the sensor platform comprises a second microphone, a level of wind noise detected at a first vehicle speed by the first microphone and a level of wind noise detected at the first vehicle speed by the second microphone is approximately the same across a particular frequency range, and the data is based at least in part on signals generated by the first microphone.

C. The method as paragraphs A-B describe, the method comprising before the collecting, removing the sensor platform from a second host vehicle, and mounting the sensor platform on to the first vehicle, the first host vehicle and the second host vehicle being different models of vehicle.

D. The method as paragraphs A-C describe, wherein the environment is within a design domain, the design domain characterized by one or more of a geographical location, an administrative region, a time of day, and a weather situation.

E. A method, comprising: collecting, by a sensor platform mounted to a first vehicle, sensor data from an environment in which the first vehicle operates, wherein the sensor platform is removably mounted on the first vehicle and the sensor platform includes two or more sensors; training, based at least in part on the sensor data, a machine-learned model for use by a purpose-built autonomous vehicle, wherein the purpose-built autonomous vehicle includes two or more sensors corresponding in modality, location and orientation to the two or more sensors of the sensor platform; and operating the purpose-built autonomous vehicle in the environment using the trained machine-learned model.

F. The method as paragraph E describes, wherein the sensor platform includes a first group of sensors including the two or more sensors, a first detection region associated with the first group of sensors extends horizontally in all directions from the first vehicle, the autonomous vehicle includes a second group of sensors including the two or more sensors, and a second detection region associated with the second group of sensors extends horizontally in all directions from the autonomous vehicle.

G. The method as paragraphs E-F describe, wherein the sensor platform comprises a first sensor, the purpose-built autonomous vehicle comprises a second sensor, the first sensor and the second sensor have substantially the same performance characteristics.

H. The method as paragraph G describes, wherein the first sensor and the second sensor are microphones, and the performance characteristic of the first sensor and the second sensor is a level of wind noise detected at a predetermined vehicle speed across a frequency range.

I. The method as paragraphs G-H describe, the method comprising before collecting the sensor data, calibrating the sensor platform while the sensor platform is mounted on the first vehicle to determine a difference in respective performance characteristics of the first sensor and the second sensor.

J. The method as paragraphs G-I describe, the method comprising processing the sensor data to compensate for a difference in the performance characteristic of the first sensor and the second sensor.

K. The method as paragraph J describes, wherein before the processing, the performance characteristic of the first sensor and the second sensor are not within a predetermined tolerance, and after the processing, the performance characteristic of the first sensor and the second sensor are within the predetermined tolerance.

L. The method as paragraphs G-L describe, wherein the performance characteristic is one or more of a resolution, a dynamic range, an emitted signal intensity, a sweep rate, a noise level, a signal to noise ratio, a frequency response, and a spatial detection capability.

M. The method as paragraphs E-L describe, wherein collecting the sensor data comprises operating the first vehicle an autonomous mode in the environment.

N. The method as paragraph M describes, wherein operating the first vehicle the autonomous mode in the environment is based on the sensor data.

O. The method as paragraphs E-N describe, the method comprising mounting the sensor platform to the first vehicle by connecting a first connector terminating a cable harness to a second connector, wherein collecting the sensor data comprises transmitting the sensor data via the cable harness.

P. The method as paragraph O describes, wherein the sensor platform comprises the second connector.

Q. The method as paragraphs E-P describe, wherein the sensor platform comprises multiplexing circuitry, the method further comprising receiving at the multiplexing circuitry via a plurality of signal paths the sensor data from two or more sensors, and transmitting by the multiplexing circuitry via a single signal path the sensor data.

R. The method as paragraphs E-Q describe, wherein the sensor platform comprises an external emitter array, the method comprising while collecting the sensor data, controlling the external emitter array to emit sound or audio signals.

S. The method as paragraph R describes, wherein controlling the external emitter array to emit the sound or audio signals is based on the sensor data.

T. One or more non-transitory computer-readable media storing instructions executable by one or more processors, wherein the instructions, when executed, cause the one or more processors to perform operations comprising: receiving, sensor data collected from a sensor platform which includes two or more sensors and which is removably mounted to a first vehicle, the sensor data collected while the first vehicle is operating in an environment; and training, based at least in part on the sensor data, a machine-learned model for use by a purpose-built autonomous vehicle, wherein the purpose-built autonomous vehicle includes two or more sensors corresponding in modality, location and orientation to the two or more sensors of the sensor platform.

U. A sensor platform configurable for collecting sensor data for use in relation to an autonomous vehicle of an autonomous vehicle model, in accordance with which the autonomous vehicle has a first group of built-in sensors, the autonomous vehicle comprising a autonomous vehicle control component configured to control the autonomous vehicle based on first sensor data generated by the first group of sensors, a detection region associated with the first group of sensors extending horizontally in all directions from the driverless vehicle, wherein the sensor platform is mountable on, and demountable from, a host vehicle of a production model which is operable in a non-autonomous manner under the control of a human occupant of the host vehicle, the sensor platform comprising a second group of sensors, wherein the sensor platform is configurable such that, when the sensor platform is mounted on the host vehicle, the locations of the second group of sensors, relative to each other, is the same as the locations of the sensors in the first group of sensors, relative to each other, and a detection region associated with the second group of sensors extends horizontally in all directions from the host vehicle.

While the example clauses described above are described with respect to one particular implementation, it should be understood that, in the context of this document, the content of the example clauses can also be implemented via a method, device, system, computer-readable medium, and/or another implementation. Additionally, any of examples A-U may be implemented alone or in combination with any other one or more of the examples A-U.

What is claimed is:

1. A method, comprising:

collecting, by a sensor platform mounted as a retrofit to a first vehicle, sensor data from an environment in which the first vehicle operates at a first time, wherein the sensor platform is removably mounted on a roof of the first vehicle and the sensor platform includes two or more sensors comprising at least a first lidar sensor and a second lidar sensor;

training, based at least in part on the sensor data, a machine-learned model deployed on a second vehicle, the second vehicle an autonomous vehicle, wherein:
the second vehicle includes two or more sensors comprising at least a third lidar sensor and a fourth lidar sensor, the two or more sensors corresponding in modality, location and orientation to the two or more sensors of the sensor platform, the second vehicle comprising one or more mounts for receiving the two or more sensors of the second vehicle, the one or more mounts integral with the second vehicle, wherein:
the third lidar sensor is positioned at a height above a road surface corresponding to a height of the first lidar sensor of the sensor platform when the sensor platform is mounted on the first vehicle; and
the fourth lidar sensor is positioned at a height above the road surface corresponding to a height of the second lidar sensor of the sensor platform when the sensor platform is mounted on the first vehicle; and
training the machine-learned model comprises training the machine-learned model to determine outputs based at least in part on a first sensor reading from a first sensor of the sensor platform such that the machine-learned model is configured to generate the outputs based at least in part on a second sensor reading from a second sensor of the second vehicle, wherein the second sensor of the second vehicle corresponds in modality, location and orientation to the first sensor of the sensor platform; and
operating the second vehicle in the environment at a second time using the trained machine-learned model, the second time after the first time.

2. The method of claim 1, wherein the sensor platform includes a first group of sensors including the two or more sensors,
a first detection region associated with the first group of sensors extends horizontally in all directions from the first vehicle,
the second vehicle includes a second group of sensors including the two or more sensors, and
a second detection region associated with the second group of sensors extends horizontally in all directions from the second vehicle.

3. The method of claim 1, wherein
the first sensor of the sensor platform and the second sensor of the two or more sensors of the second vehicle have respective performance characteristics that differ by less than a predetermined threshold.

4. The method of claim 3, wherein
the first sensor and the second sensor are microphones, and the performance characteristic of the first sensor and the second sensor is a level of wind noise detected at a predetermined vehicle speed across a frequency range.

5. The method of claim 3, the method comprising
before collecting the sensor data, calibrating the sensor platform while the sensor platform is mounted on the first vehicle to determine a difference in respective performance characteristics of the first sensor and the second sensor.

6. The method of claim 3, the method comprising
processing the sensor data to compensate for a difference in the performance characteristic of the first sensor and the second sensor.

7. The method of claim 6, wherein before the processing, the performance characteristic of the first sensor and the second sensor are not within a predetermined tolerance, and
after the processing, the performance characteristic of the first sensor and the second sensor are within the predetermined tolerance.

8. The method of claim 3, wherein the performance characteristic is one or more of a resolution, a dynamic range, an emitted signal intensity, a sweep rate, a noise level, a signal to noise ratio, a frequency response, and a spatial detection capability.

9. The method of claim 1, wherein collecting the sensor data comprises operating the first vehicle in an autonomous mode in the environment.

10. The method of claim 9, wherein operating the first vehicle in the autonomous mode in the environment is based on the sensor data.

11. The method of claim 1, the method comprising
mounting the sensor platform to the first vehicle by connecting a first connector terminating a cable harness to a second connector, wherein
collecting the sensor data comprises transmitting the sensor data via the cable harness.

12. The method of claim 11, wherein the sensor platform comprises the second connector.

13. The method of claim 1, wherein the sensor platform comprises multiplexing circuitry, the method further comprising
receiving at the multiplexing circuitry via a plurality of signal paths the sensor data from two or more sensors, and
transmitting by the multiplexing circuitry via a single signal path the sensor data.

14. The method of claim 1, wherein the sensor platform comprises an external emitter array, the method comprising
while collecting the sensor data, controlling the external emitter array to emit sound or audio signals.

15. The method of claim 1, wherein a height of the sensor platform is adjustable to adjust a height of the first lidar sensor and the second lidar sensor to correspond to the height of the third lidar sensor and the fourth lidar sensor respectively.

16. One or more non-transitory computer-readable media storing instructions executable by one or more processors, wherein the instructions, when executed, cause the one or more processors to perform operations comprising:
receiving sensor data collected from a sensor platform which includes two or more sensors comprising at least a first lidar sensor and a second lidar sensor, and which is removably mounted as a retrofit to a first vehicle, the sensor data collected while the first vehicle is operating in an environment at a first time; and
training, based at least in part on the sensor data, a machine-learned model deployed on a second vehicle operating at a second time, the second vehicle an autonomous vehicle, wherein:
the second vehicle includes two or more sensors comprising at least a third lidar sensor and a fourth lidar sensor, the two or more sensors corresponding in modality, location and orientation to the two or more sensors of the sensor platform, the second vehicle comprising one or more mounts for receiving the two or more sensors of the second vehicle, the one or more mounts integral with the second vehicle, wherein:
the third lidar sensor is positioned at a height above a road surface corresponding to a height of the first lidar sensor of the sensor platform when the sensor platform is mounted on the first vehicle; and the fourth lidar sensor is positioned at a height above the road surface corresponding to a height of the second lidar sensor of the sensor platform when the sensor platform is mounted on the first vehicle; and training the machine-learned model comprises training the machine-learned model to determine outputs based at least in part on a first sensor reading from a first sensor of the sensor platform such that the machine-learned model is configured to generate the outputs based at least in part on a second sensor reading from a second sensor of the second vehicle, wherein the second sensor of the second vehicle corresponds in modality, location and orientation to the first sensor of the sensor platform.

17. A method, comprising:

collecting, by a sensor platform mounted as a retrofit to a first vehicle operating in an environment at a first time, sensor data generated by a first group of sensors mounted on a sensor platform, wherein the sensor platform is removably mounted on a roof of the first vehicle, a first detection region associated with the first group of sensors extends horizontally in all directions from the first vehicle, and the first vehicle is operable in a non-autonomous manner under the control of a human occupant of the first vehicle, the first group of sensors comprising at least a first lidar sensor and a second lidar sensor;

training, based at least in part on the sensor data, a machine-learned model deployed on a second vehicle, the second vehicle an autonomous vehicle, wherein:

the second vehicle includes a second group of sensors comprising two or more sensors each corresponding in modality, location and orientation to one of the sensors of the first group of sensors, a second detection region associated with the second group of sensors extending horizontally in all directions from the second vehicle, each of the second group of sensors mounted within a different respective sensor pod, each respective sensor pod comprising one or more sensors, each respective sensor pod being coupled to a respective mount on the second vehicle, wherein:

the second group of sensors comprises at least a third lidar sensor and a fourth lidar sensor;

the third lidar sensor is positioned at a height above a road surface corresponding to a height of the first lidar sensor of the first group of sensors when the sensor platform is mounted on the first vehicle; and the fourth lidar sensor is positioned at a height above the road surface corresponding to a height of the second lidar sensor of the first group of sensors when the sensor platform is mounted on the first vehicle; and training the machine-learned model comprises training the machine-learned model to determine outputs based at least in part on a first sensor reading from a first sensor of the first group of sensors of the sensor platform of the first vehicle such that the machine-learned model is configured to generate the outputs based at least in part on a second sensor reading from a second sensor of the second group of sensors of the second vehicle, wherein the second sensor of the second vehicle corresponds in modality, location and orientation to the first sensor of the sensor platform of the first vehicle; and operating the second vehicle in the environment at a second time using the trained machine-learned model, the second time after the first time.

18. The method of claim 17, wherein the second vehicle comprises a first microphone, the sensor platform comprises a second microphone, a level of wind noise detected at a first vehicle speed by the first microphone and a level of wind noise detected at the first vehicle speed by the second microphone differ by less than a predetermined threshold across a particular frequency range, and the sensor data is based at least in part on signals generated by the first microphone.

19. The method of claim 17, the method comprising before the collecting, removing the sensor platform from a further host vehicle, and mounting the sensor platform on to the first vehicle, the first vehicle and the further host vehicle being different models of vehicle.

20. The method of claim 17, wherein the environment is within a design domain, the design domain characterized by one or more of a geographical location, an administrative region, a time of day, and a weather situation.

* * * * *